US008196089B2

(12) United States Patent
Bouchard, Sr. et al.

(10) Patent No.: US 8,196,089 B2
(45) Date of Patent: Jun. 5, 2012

(54) PATTERN-BASED DEVELOPMENT OF COMPUTER SYSTEM SOLUTIONS

(75) Inventors: Peter D. Bouchard, Sr., Wolcutt, CT (US); Tamar Ellam, New York City, NY (US); Hidayatullah Habeebullah Shaikh, Mohegan Lake, NY (US); Ruth Edith Willenborg, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1272 days.

(21) Appl. No.: 11/868,976

(22) Filed: Oct. 9, 2007

(65) Prior Publication Data
US 2009/0094576 A1    Apr. 9, 2009

(51) Int. Cl.
*G06F 9/44* (2006.01)
(52) U.S. Cl. ............... 717/104; 717/106; 717/121
(58) Field of Classification Search .......... 717/100–109, 717/114–123
See application file for complete search history.

(56) References Cited

U.S. PATENT DOCUMENTS
7,007,266 B1 * 2/2006 Isaacson .................. 717/100

OTHER PUBLICATIONS

Lutterkort et al., "Manageable Virtual Appliances", Jun. 2007, Proceedings of the Linux Symposium, Canada, pp. 293-302.*
Smith et al, "IBM e-Business Technology, Solution, and Design Overview", 2004, IBM RedBooks, Student Edition, pp. i-xiv, 1-367.*

* cited by examiner

*Primary Examiner* — Ted T Vo

(57) ABSTRACT

The problems that normally attend the development and deployment of a computer system solution are reduced by employing patterns and virtual images in the development and deployment process. When information had been acquired about a data processing need to be met, pattern representing a generalized solution to that need is selected. A set of previously-developed virtual images supporting the selected pattern is chosen. Once information representing the specific need is received, the selected pattern is modified to represent a specific solution. Parameters are obtained for the specific solution and a set of scripts integrating the parameters is generated. The scripts are used to reconfigure the virtual images. The reconfigured virtual images are combined into a computer system solution that can be loaded and run with little or no further configuration.

15 Claims, 5 Drawing Sheets

PATTERN-BASED DEVELOPMENT OF COMPUTER SYSTEM SOLUTIONS

BACKGROUND OF THE INVENTION

The present invention relates to development of computer systems solutions and more particularly to the development of such solutions using patterns and virtual machines.

Development of high-quality computer applications can be very difficult given the time and budget constraints that the developers of such applications ordinarily must comply with. The abundance of hardware architectures, the diversity of available operating systems and network platforms, and the demands of global competition make it increasingly difficult to build high quality software from the ground up within typical time and cost constraints.

To build quality software today, many organizations stress the reuse of existing software models, designs and implementations that have already proven themselves to be useful. In an effective reuse process, attempts are made to limit the use of new code to code that is specific to a particular application.

Moreover, software development organizations have begun to use patterns in developing new software applications. In simple terms, a pattern can be defined as a model or plan used as a guide in making things. The existence of patterns grew out of a realization that software developers must face similar challenges related to a myriad of programming topics, such as persistence, distribution, flow control, error handling, etc., in many different applications and domains. Over time, experienced software developers and architects created a body of literature that document different types of reusable knowledge in the form of patterns.

Patterns codify reusable or repeatable experience and knowledge of people who have previously performed, perhaps many times, the task represented by the pattern. Patterns serve to document both proven solutions to problems and proven pitfalls that have been encountered in prior attempts to solve the problems and should be avoided. One example of reusable knowledge is a design pattern that describes the elements of a software system and the relationships among them and provides a common structure for communicating elements that solved a general problem within a particular context. Another example of reusable knowledge is an architectural pattern that expresses the overall structural organization of software systems and provides predefined subsystems with the specified responsibilities and relationships among the subsystems.

A pattern is basically a starting point of a process for the development of a specific software solution. Patterns enable a software developer to work along a path beginning with a pattern and ending with specific software products that must be selected and configured to work together in a runtime package that provides an executable solution for the specific problem.

BRIEF SUMMARY OF THE INVENTION

The invention may be embodied as a method for creating a computer system solution. A pattern representing a generalized solution for a data processing need is selected. A set of virtual images supporting the selected pattern is chosen and the selected pattern is modified to represent a specific solution for the data processing need. Parameters for the specific solution are obtained and a set of scripts integrating the obtained parameters is created. At least one virtual image in the set of virtual images is reconfigured using at least one of the scripts. The virtual images are combined to provide the desired computer system solution.

The invention may also be embodied as a system for creating a computer system solution for a particular data processing need beginning with an existing pattern representing a generalized solution for the data processing need. Selection logic is employed to select a set of virtual images supporting the selected existing pattern. Modification logic is employed to modify the pattern to create a specific solution for the data processing need. Acquisition logic is used to obtained parameters for the specific solution and scripting logic is employed to create a set of scripts integrating the obtained parameters. Reconfiguration logic is used to reconfigure at least one of the virtual images using at least one of the created scripts. Combination logic is employed to combine the virtual images into the computer system solution.

Finally, the invention may be embodied as a computer program product for creating a computer system solution for a particular data processing need beginning with an existing pattern representing a generalized solution for the need. The computer program product includes a computer usable medium embodying computer usable program code configured to select a set of virtual images supporting the existing pattern and to modify the existing pattern to represent a specific solution for the data processing need. The computer program product further includes code configured to obtain parameters for the specific solution and to create a set of scripts integrating the obtained parameters. Finally, the computer program product includes code configured to reconfigure at least one virtual images in a set of virtual machines and to combine the virtual images into the desired computer system solution.

DETAILED DESCRIPTION OF THE INVENTION

Figure 1:
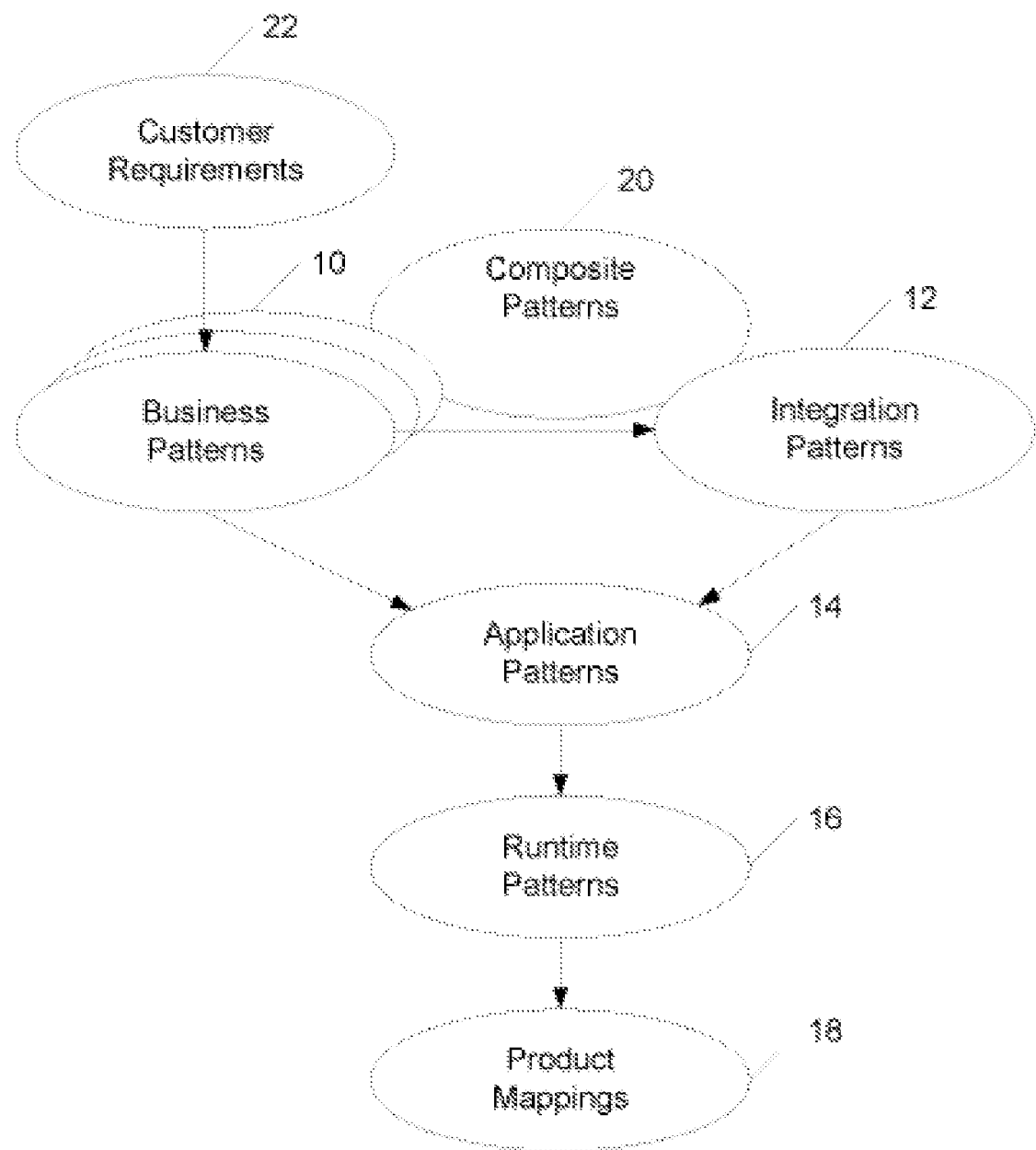
FIG. 1 is a functional illustration of a multilevel set of patterns that can be used in a conventional sequence to create a system solution.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a representation of a multi-layered e-business model that is currently being used to build solutions for the e-business marketplace. The model is offered as an example of a pattern. This model bridges the gap between business and information technology by defining architectural patterns at various levels, enabling a solution developer to easily navigate from one level to the next. The model includes business patterns 10, integration patterns 12, application patterns 14 and runtime patterns 16, all of which are discussed below in more detail. The model further includes product mappings 18 and composite patterns 20, also discussed below. The model is structured in a way that each level of detail builds on the last.

Business patterns represent common business problems. The patterns provide tangible solutions to frequently encountered business challenges by identifying common interactions among users, business and data. A business executive can match a business requirement to business patterns that have already documented potential solutions for the requirement. In the drawing, business requirements takes the form of customer requirements 22 used in selecting the appropriate business pattern.

One example of a business pattern is a self-service business pattern that describes applications in which users interact with the business via the Internet or an intranet. Simple website applications are an example of a self-service application. Another example of a business pattern is a collaboration application where the Internet or an intranet supports collaborative work among users. Examples of collaboration applications include e-mail, instant messaging and video conferencing. Other significant business patterns represent information aggregation applications (e.g., data mining) and extended enterprise applications (e.g., supply chain management).

Integration patterns tie mobile business patterns together to solve a problem. One example of an integration pattern is an access integration pattern which integrates a number of services through a common entry point; e.g., a portal. Another example of an integration pattern is an application integration pattern which ties together multiple applications and data sources without a user having to directly invoke them. Examples of application integration patterns include message brokers and workflow managers.

Composite patterns combine business patterns and integration patterns to create complex, advanced applications. Examples of composite patterns are electronic commerce patterns used in developing user-to-online-buying applications, account access patterns used in developing applications that provide customers with around-the-clock account access, and trading exchange patterns used in developing applications that allow buyers and sellers to trade goods and services on a public site Application patterns are used in making decisions related to the architecture of a proposed solution. Application patterns help refine higher level patterns (business, integration, composite) and are used to identify high-level logical components needed to implement key functions in a selected higher-level pattern. Each application pattern describes the solution structure, the placement of data and the degree of integration (loosely coupled or tightly coupled) of involved systems. An application pattern is supported by middleware that is expressed as one or more runtime patterns.

A runtime pattern describes the logical architecture required to implement a higher-level pattern. A runtime pattern defines logical middleware nodes, the roles of those nodes and the interfaces among them in order to satisfy business requirements conveyed through the higher-level patterns. Runtime pattern documents must be employed to complete an application but do not specify the exact underlying software/hardware products that must be in place.

Identification of the exact underlying software/hardware products is part of a product mapping phase. While the use of patterns may make it easier to identify appropriate software/hardware products in implementing the solution, the underlying software/hardware products, once identified in the product mapping phase, must still be installed and configured conventionally. Conventional installation and configuration practices can be complex and open to errors. Many configuration parameters must be set correctly to assure proper interaction among components. Whoever is doing the installation, whether a customer or a supplier, must have high levels of installation and configuration skills.

The present invention reduces the complexity of the application development/installation/configuration process by coupling the use of patterns with virtual images or virtual machines representing underlying software products. In the following description, the terms "virtual image" and "virtual machine" may be used interchangeably.

Generally speaking, a virtual machine is software that integrates application code and an execution environment for the application code. Multiple virtual machines can exist on a single physical server that controls the virtual machines through a virtual machine monitor or hypervisor. The execution environment in a virtual machine may be based on an operating system other than the operating system used by the physical server. Because the operating system in the virtual machine is isolated from the operating system for the hypervisor, applications written for different operating systems can be executed in virtual machines running on the same physical server.

Figure 2:
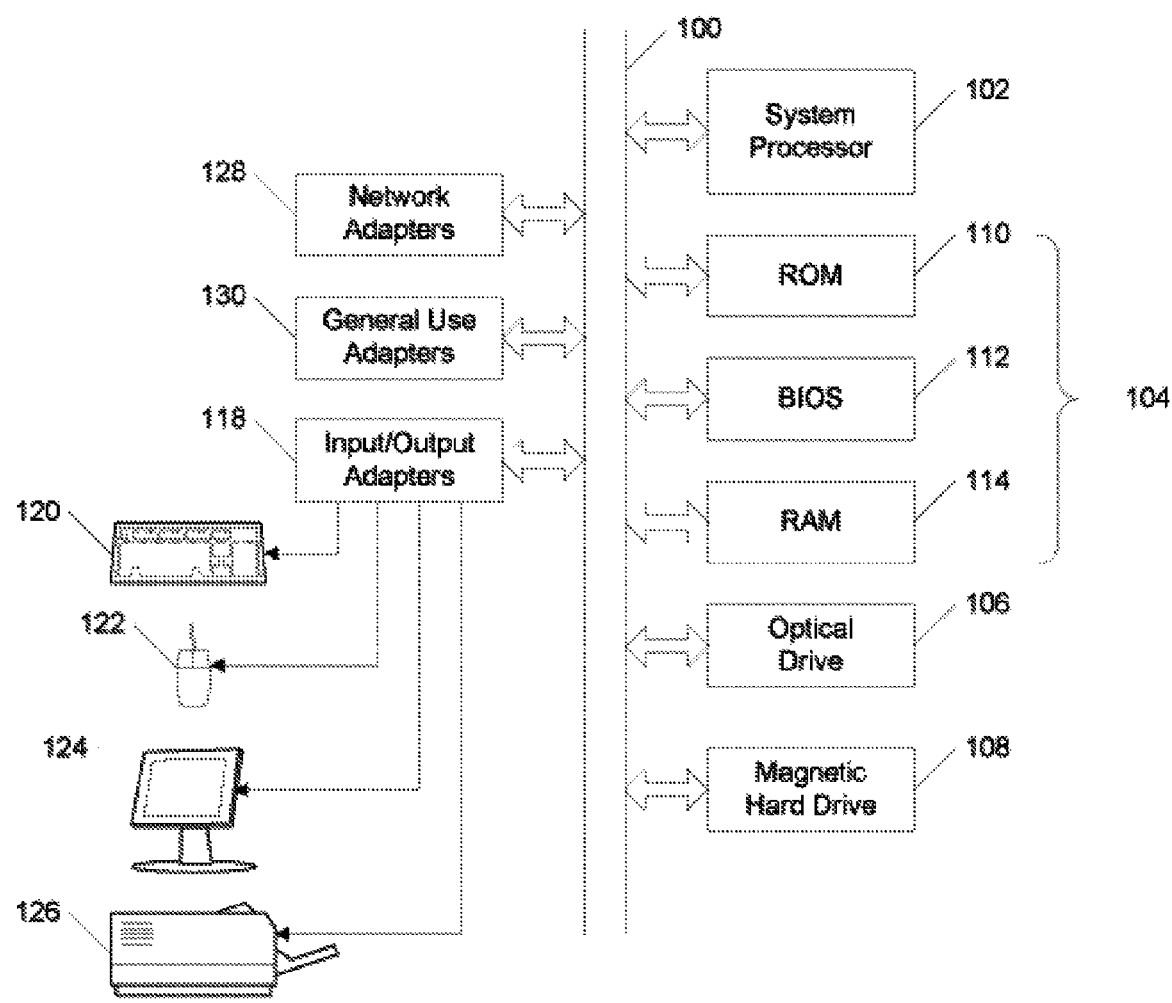
FIG. 2 is a functional block diagram of the hardware infrastructure of a general purpose programmable device that may be used for a physical server that supports implementations of the present invention.

FIG. 2 represents the physical infrastructure of a general purpose computer system that can be used for the physical server. A typical general purpose computer system includes an internal system bus 100, a system processor 102, internal memory components 104 and one or more "external" memory components, such as an optical drive 106 and a magnetic hard drive 108. The internal memory 104 includes specific types of memory such as read only memory (ROM) 110, basic input/out system (BIOS) memory 112 and random access memory (RAM) 114. The BIOS 112 stores configuration information for the computer system and basic routines used to control the transfer of information among the components of the computer system.

Drives, such as optical drive 106 and hard drive 108, provide non-volatile storage for applications and processes that execute in the computer system and for data used in and/or generated by those applications and processes. Depending on the technology employed, the drives may include removable media. The special purpose programming needed by a computer system to implement the described invention would typically be stored in one of these drives and transferred as needed into RAM 114. Local drives, such as those discussed above, may be supplemented by network-accessible drives.

The computer system also includes a significant number of input/output (I/O) adapters 118 that provide interfaces between a variety of input/output devices and the remainder of the computer system. Common examples of input/output devices include keyboard 120, mouse 122, monitor 124 and printer 126.

The computer system can be connected to other systems through network adapters 128, which may support wired or wireless network connections. Finally, the computer system may include what are characterized as general use adapters that can be used for a number of different purposes. For example, USB (Universal Serial Bus) adapters can be used to connect typical input/output devices (such as keyboards, monitors, etc.), auxiliary memory devices, such as flash memory cards, portable hard drives and even high capacity magnetic hard drives, wireless network transceivers and many other kinds of devices to the computer system.

It should not be inferred that only the devices shown in the drawing or discussed above can be part of the computer system. There are simply too many different types of devices to include in a drawing. Moreover, it should not be implied that the input/output adapters or general use adapters are limited to the technologies mentioned. There are too many different types of device adapters to include all in the drawing. Current examples of port technologies that are successfully used include not only USB, but also serial ports, parallel ports, SCSI, FireWire ports and infrared ports. Other port technologies undoubtedly already exist or will be developed.

Virtual machine concepts can be implemented in a general-purpose computer system of the type described above in several ways, such as by running special software in the system to create a software component commonly referred to as a Virtual Machine Monitor (VMM), or hypervisor. The combination of the required system hardware and software for virtual machine operation is sometimes referred to as a hypervisor platform.

Figure 3:
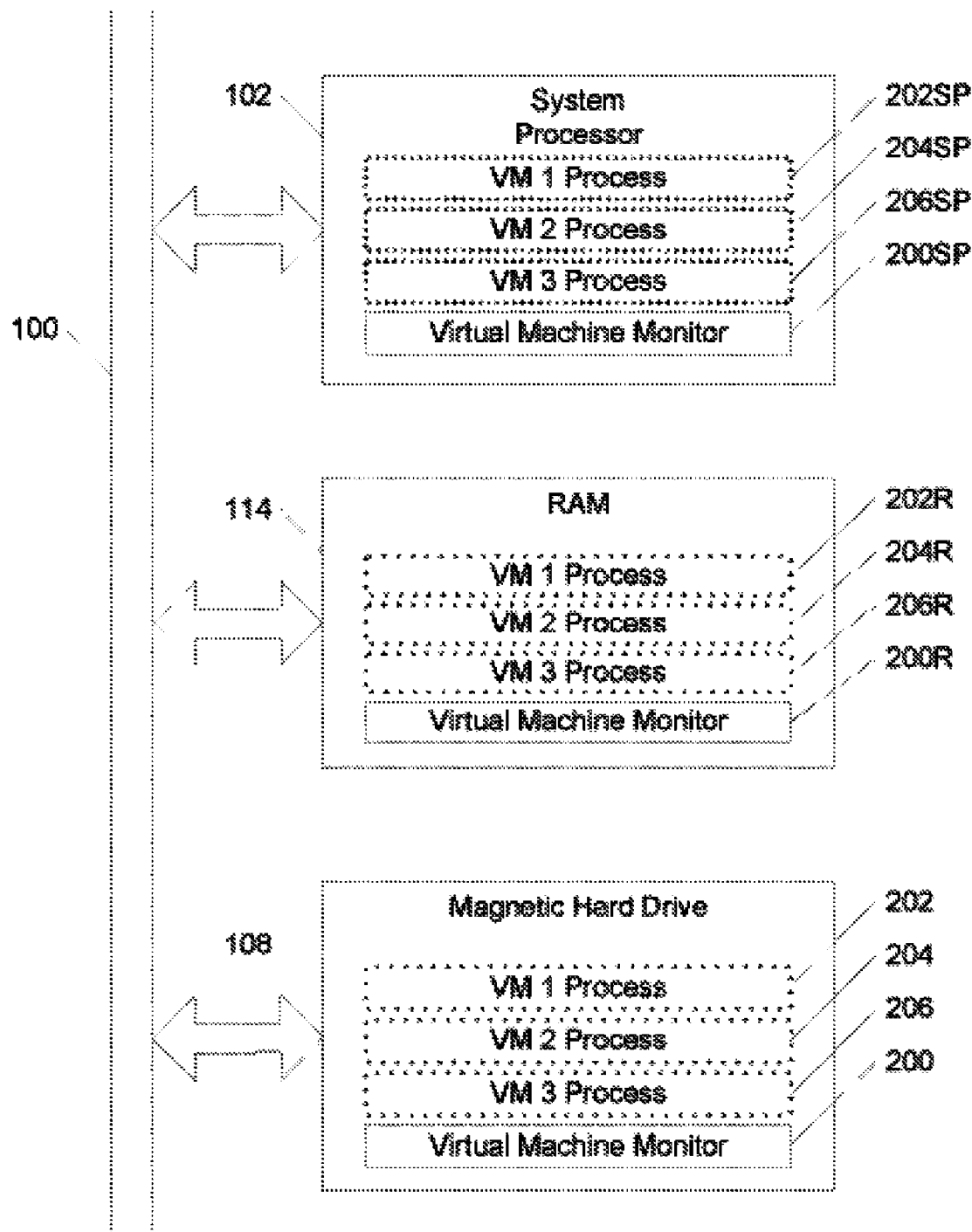
FIG. 3 is more detailed functional block diagram of the hardware infrastructure indicating how the infrastructure is used in implementing virtual machines.

FIG. 3 is a more detailed view of a portion of the general purpose computer system previously described with reference to FIG. 2. FIG. 3 shows the system bus 100, system processor 102, magnetic hard drive 108, and RAM memory 114, all of which play significant roles when the general-purpose computer system is used to create and manage virtual machines.

Until it is executed, VMM software 200 is stored on magnetic hard drive 108 like any other software to be executed in the computer system. Once the VMM software 200 is invoked, elements 200R of the code are loaded into RAM memory 114 and are executed (as elements 200SP) by the system processor to define and manage one or more virtual machines.

Virtual machines can also be implemented through the use of hardware partitioning techniques that subdivide a server device into fractions, each of which can run an operating system, or through the use of hypervisor firmware that runs directly on a server. Use of the present invention is not limited to any particular virtual machine implementation.

The states of the code 200R stored in RAM 114 and 200SP being executed in the system processor 102 along with data stored on magnetic hard drive 108 define one or more virtual machines 202-204. The virtual machines can be thought of as a number of parallel software processes 202SP-206SP and 202R-206R co-existing in system processor 102 and RAM 114, respectively, using data and code retrieved from and sent to the hard drive 108.

As will be described below, a pattern can be used in combination with a virtual image to provide a fully installed and configured solution that can execute a system of the type described below. The combination of patterns and virtual images provides flexibility to support different installation and configuration needs and an ability to configure interactions across virtual machines.

In accordance with the present invention, a complex application can be more easily defined, implemented, installed and configured. Initially, a set of patterns (such as the e-business pattern described earlier) is defined. A corresponding set of virtual images is created. The virtual images are pre-installed and configured to support the patterns but lack specific configuration data required to personalize the patterns for a specific user topology and environment.

The specific user topology and environment constitute configuration data that must be captured in order to personalize the virtual images. The personalized or reconfigured images can be packaged as new images. The new images can be shipped to a user/customer as a pre-built and ready to run application.

Figure 4:
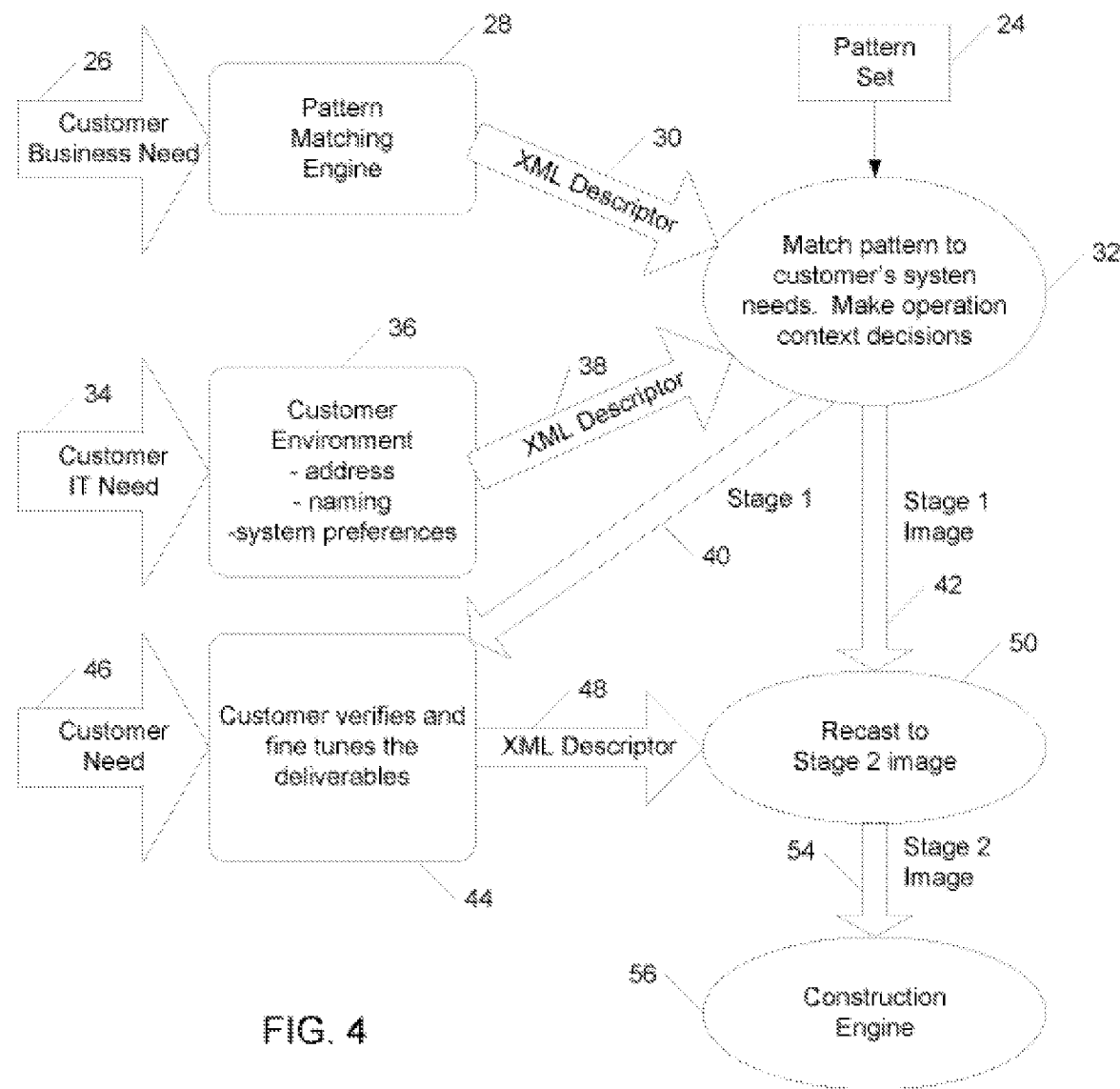
FIG. 4 is a functional illustration of a process according to the present invention for developing a system solution beginning with an existing pattern.

FIG. 4 is a flow diagram showing a possible implementation of the present invention. The main components of the implementation include a set of patterns 24 and a set of virtual images (not explicitly shown) based on the patterns. The process is initiated by establishing a customer business need 26 which can be formulated as a customer's response to a series of questions posed by the system creator or the customer's own Information Technology (IT) people. The expressed business need is an input to a pattern matching engine 28 that selects one of the business patterns known to be available in set 24. Multiple patterns can exist in the set 24. One example of such a pattern is the e-business pattern discussed earlier. The pattern matching engine 28 selects a business pattern (or integration pattern or composite pattern) that appears to satisfy the customer's business needs. The end result is an XML document 30 that is used to match the chosen pattern to the customers system needs in an operation 32.

After gathering information about customer's business needs, information about the customer's technology structure and environment is gathered as a set of responses 34 that provide information about customer's environment, including such information as address spaces, file naming requirements and system preferences. The customers IT needs are embodied in an XML descriptor 38 that, like descriptor 30, includes parameters that can be used in modifying the selected pattern to meet the customer's needs.

The parameters provided in the descriptors 30 and 38 are used to personalize virtual images (not specifically shown) to satisfy the customer's business and IT needs. A description of the modified virtual images is returned to the customer in a Stage 1 document while the modified images (Stage 1 image 42) are made available for further changes. At this point, customer input is used to verify the modified virtual images. If changes need to be made in the images, an XML descriptor is generated in the form of a script that is packaged with the stage 1 image to recast the image into a stage 2 or final image in an operation 50.

The end result of the above process is a set of virtual machine image(s) 54 that can be shipped ready to run once started in the customer environment.

Figure 5:
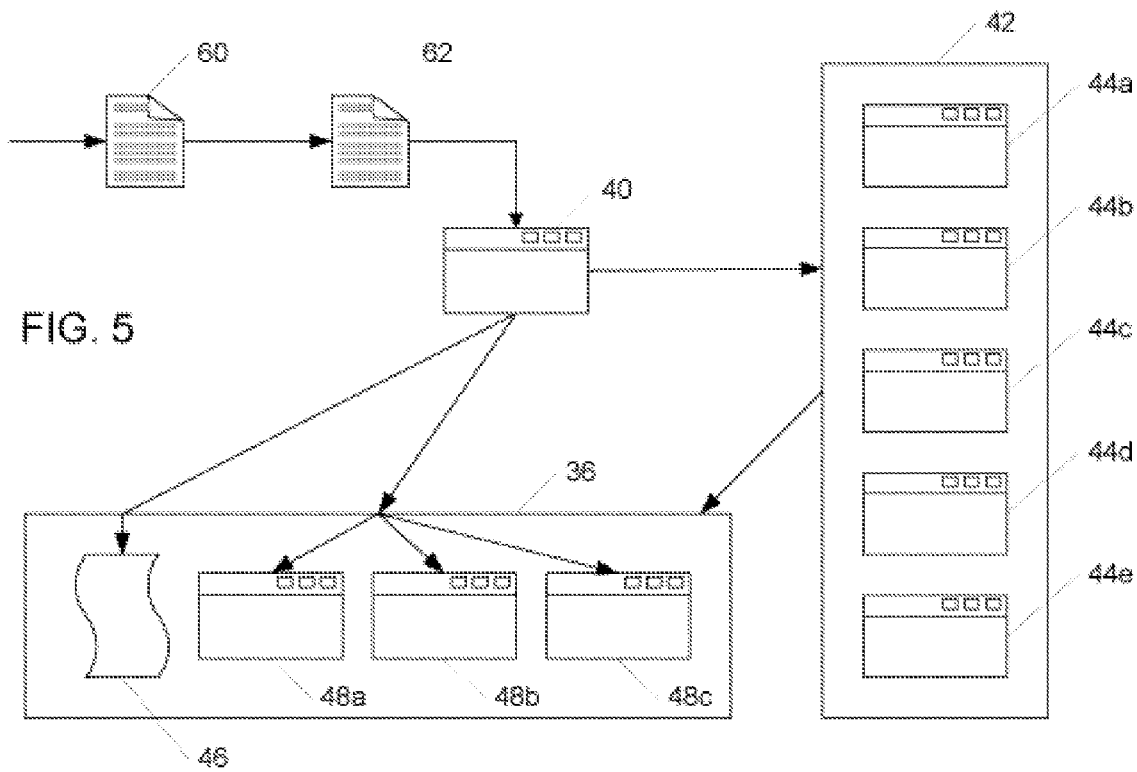
FIG. 5 is a different perspective on the process.

FIG. 5 is a more document-oriented view of the process. A customer's requirements (both business and IT) are represented by a document 60 that can be converted to an XML configuration document 62 that provides one input to a configuration engine 40. A configuration engine output is used to select one or more virtual images 44a-44e from a set 42 of available images. The configuration engine 40 also provides output that causes XML configuration scripts and XML configuration documents 46 to be generated. The scripts 46 are used to modify selected ones of the generic images 44a-44e to produce virtualized images 48a-48c that require no significant configuration after being distributed to a customer. The customer has only to load the virtualized images into its hypervisor platform and begin running the images.

Figure 6:
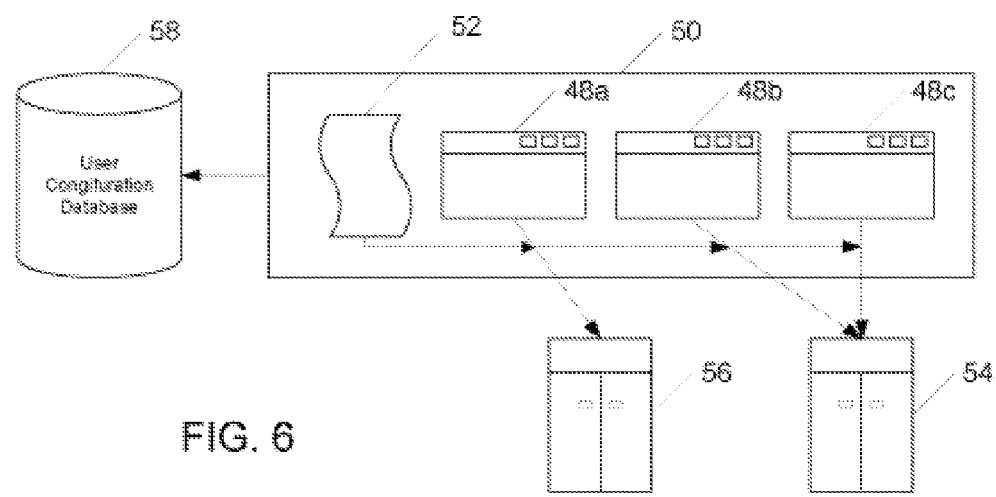
FIG. 6 is functional illustration of a customer's perspective of the use of the end result of the process.

FIG. 6 shows steps that are performed by the customer when the virtualized images 48a-48c are received. An install script 52 preferably uses customized XML configuration information to install the images on customer physical systems, such as system 54 and 56. Configuration information is also pushed to a user configuration database 58 maintained by the customer and/or the software supplier.

It is possible that a needed virtualized image is already installed on a customer's system. If that is the case, the installed image can be reused without requiring a second installation. If the installed image must be reconfigured, a script may be run in the customer environment to perform the necessary reconfiguration.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for a creating a computer system solution implemented as executable computer program code, said method comprising:
    selecting a pattern representing a generalized solution for a data processing need;
    selecting a set of virtual images supporting the selected pattern, each of said virtual images including executable program code;
    receiving information representing the specific data processing need to be met;
    modifying the selected pattern to represent a specific solution for the specific data processing need;
    obtaining parameters for the specific solution;
    creating a set of scripts integrating the obtained parameters;
    reconfiguring, using at least one script in the set of scripts, the executable program code in at least one virtual image in the set of virtual images, said reconfiguring further comprising executing said at least one script to effect the reconfiguration of the executable program code in said at least one virtual image;
    combining the executable program code in said set of virtual images into the computer system solution for the specific data processing need; and
    storing the combined executable program code in a non-transitory computer usable medium.

2. A method according to claim 1 wherein receiving information representing the specific data processing need to be met further comprises receiving information about a specific business need to be met.

3. A method according to claim 2 wherein receiving information representing the specific data processing need to be met further comprises receiving information about the information technology to be used in meeting the specific data processing need.

4. A method according to claim 3 wherein obtaining parameters for the specific solution further comprises generating an XML document defining the obtained parameters.

5. A method according to claim 4 wherein reconfiguring, using at least one script in the set of scripts, at least one virtual image in the set of virtual images further comprises:
    performing an initial reconfiguration of executable program code in said at least one virtual image;
    making the initially reconfigured executable program code available for review;
    altering the initially reconfigured executable program code in accordance with input received as a result of the review.

6. A system for creating a computer system solution for a particular data processing need beginning with an existing pattern representing a generalized solution for the data processing need, said computer system solution being implemented as executable computer program code, said system comprising:
    selection logic for selecting a set of virtual images supporting a selected existing pattern, each of said virtual images including executable program code;
    receiving logic for receiving information representing the specific data processing need to be met;
    modification logic for modifying said existing pattern to represent a specific solution for the data processing need;
    acquisition logic for obtaining parameters for the specific solution;
    scripting logic for creating a set of scripts integrating the obtained parameters;
    reconfiguration logic for, using at least one script in the set of scripts, reconfiguring the executable program code in at least one virtual image in the set of virtual images, said reconfiguration logic further comprising logic for executing said at least one script in the set of scripts to effect the reconfiguration of said executable program code; and
    combination logic for combining the executable program code in said set of virtual images into the computer system solution for said particular data processing need.

7. A system according to claim 6 wherein said receiving logic for receiving information representing the specific data processing need to be met further comprises logic for receiving information about a specific business need to be met.

8. A system according to claim 7 wherein said receiving logic for receiving information representing the specific data processing need to be met further comprises logic for receiving information about the information technology to be used in meeting the specific data processing need.

9. A system according to claim 8 wherein said acquisition logic for obtaining parameters for the specific solution further includes XML generation logic for generating an XML document defining the obtained parameters.

10. A system according to claim 9 wherein said reconfiguration logic further comprises logic for:
    performing an initial reconfiguration of the executable program code in one or more of said virtual images;
    making the initial reconfiguration available for review; and
    altering the initial reconfiguration in accordance with input received as a result of the review.

11. A computer program product for creating a computer system solution for a particular data processing need beginning with an existing pattern representing a generalized solution for the data processing need, said computer system solution being implemented as executable computer program code, the computer program product comprising a non-transitory computer usable storage medium having computer usable program code embodied therewith, the computer usable program code embodied in said non-transitory computer usable storage medium comprising:
    computer usable program code configured to select a set of virtual images supporting said selected pattern, each of said virtual images including executable program code;
    computer usable program code configured to receive information representing the specific data processing need to be met;
    computer usable program code configured to modify the selected pattern to represent a specific solution for the data processing need;
    computer usable program code configured to obtain parameters for the specific solution;
    computer usable program code configured to create a set of scripts integrating the obtained parameters;
    computer usable program code configured to reconfigure, using at least one script in the set of scripts, the executable program code in at least one virtual image in the set of virtual images, said computer usable program code further comprising computer usable program code for executing said at least one script in the set of scripts to effect the reconfiguration of said executable program code; and computer usable program code configured to combine the executable program code in said set of virtual images into the computer system solution for the specific data processing need.

12. A computer program product according to claim 11 wherein the computer usable program code configured to receive information representing the specific data processing need to be met further comprises computer usable program code configured to receive information about a specific business need to be met.

13. A computer program product according to claim 12 wherein the computer usable program code configured to receive information representing the specific data processing need to be met further comprises computer usable program code configured to receive information about the information technology to be used in meeting the specific data processing need.

14. A computer program product according to claim 13 wherein the computer usable program code configured to obtain parameters for the specific solution further comprises computer usable program code configured to generate an XML document defining the obtained parameters.

15. A computer program product according to claim 14 wherein the computer usable program code configured to reconfigure, using at least one script in the set of scripts, at least one virtual image in the set of virtual images further comprises:
- computer usable program code configured to perform an initial reconfiguration of executable program code in the said at least one virtual image;
- computer usable program code configured to make the initially reconfigured executable program code available for review; and
- computer usable program code configured to alter the initially reconfigured executable program code in accordance with input received as a result of the review.

* * * * *